APPARATUS FOR LOADING A DEHUMIDIFYING DEVICE

Filed March 24, 1961 8 Sheets-Sheet 1

INVENTOR.
Robert R. Beckham
BY
Nobbe & Swope
ATTORNEYS

INVENTOR.
Robert R. Beckham
BY
Nobbe & Swope
ATTORNEYS

APPARATUS FOR LOADING A DEHUMIDIFYING DEVICE

Filed March 24, 1961 8 Sheets-Sheet 3

INVENTOR.
Robert R. Beckham
BY
Nobbe & Swope
ATTORNEYS

INVENTOR.
Robert R. Beckham
BY
Nobbe & Swope
ATTORNEYS

May 11, 1965 R. R. BECKHAM 3,182,433

APPARATUS FOR LOADING A DEHUMIDIFYING DEVICE

Filed March 24, 1961 8 Sheets-Sheet 5

INVENTOR.
Robert R. Beckham
BY
Nobbe & Swope
ATTORNEYS

May 11, 1965 R. R. BECKHAM 3,182,433

APPARATUS FOR LOADING A DEHUMIDIFYING DEVICE

Filed March 24, 1961 8 Sheets-Sheet 6

INVENTOR.

Robert R. Beckham

BY

Nobbe & Swope

ATTORNEYS

INVENTOR.
Robert R. Beckham
BY
Nobbe & Swope
ATTORNEYS

APPARATUS FOR LOADING A DEHUMIDIFYING DEVICE

Filed March 24, 1961 8 Sheets-Sheet 8

INVENTOR.
Robert R. Beckham
BY
Nobbe & Swope
ATTORNEYS

United States Patent Office 3,182,433
Patented May 11, 1965

3,182,433
APPARATUS FOR LOADING A DEHUMIDIFYING DEVICE

Robert R. Beckham, Toledo, Ohio, assignor to Libbey-Owens-Ford Glass Company, Toledo, Ohio, a corporation of Ohio Filed Mar. 24, 1961, Ser. No. 98,034
17 Claims. (Cl. 53—183)

This invention relates broadly to a tube filling and sealing apparatus, and more particularly it is concerned with an apparatus for loading a dehumidifying device used in multiple sheet glazing units.

In the multiple sheet glazing art, one conventional type of unit consists of a pair of glass sheets held in substantial parallelism and spaced from one another by a separator strip which is secured to the inner faces of the marginal edge portions of the glass sheets to enclose a hermetically sealed space therebetween. A very important requisite of such units, and one with which the present invention has particular pertinency, is the prevention, or substantial elimination, of condensation of moisture on the inner surfaces of the glass sheets composing the unit.

Units of this general type have been produced in accordance with the procedure set forth in United States Patent No. 2,235,681 to C. D. Haven et al. issued March 18, 1941. In these units, the space between the sheets is hermetically sealed, permitting the use of desiccated air in the enclosed space to improve the efficiency or insulation value of the units. The metal separator strip, which is firmly bonded to the glass by a strong metal-to-glass bond, also serves as a vapor barrier.

It has been found with glazing units of this type, however, that in spite of elaborate precautions taken to prevent the introduction of moisture into the enclosed space during fabrication of the unit, and despite great effort to remove any moisture which does make its way into the space during fabrication, small amounts of moisture can be expected to appear in the enclosed space at some time during the life of the unit. This moisture can be acquired through small cracks which develop in the area where the metal separator strip is bonded to the glass sheet, the small cracks developing as a result of repeated flexing produced by temperature and barometric change, vibration, and shock. Such moisture is highly objectionable from a commercial standpoint because even a slight amount can, when condensed, provide significant visual obstructions in the unit.

Therefore it has been found advisable, in order to insure the prevention of condensation of moisture on the inner glass surfaces, to provide a dehumidifying device within the enclosed space which will readily absorb moisture that gains access thereto either during fabrication of the unit or during its subsequent use. Such devices, in glazing units of the above character, customarily comprise a sealed, hollow plastic tube containing a desiccant material, the plastic tube being mounted on the inner surface of the separator strip in a special way during fabrication of the unit. It is specifically with respect to such desiccant carrying tubes that the present invention is concerned.

It is the primary purpose and object of the invention to provide an apparatus for cutting predetermined lengths of plastic tubing from a continuous supply, filling the tube with a specified amount of a desiccant material, sealing the ends of the tube to retain the desiccant therein, and placing the desiccant filled tube in a storage chamber, all of which is accomplished in a continuous, uninterrupted manner.

Other objects and advantages of the invention will become more apparent during the course of the following description when taken in connection with the accompanying drawings.

In the drawings, wherein like numerals are employed to designate like parts throughout the same:

Figures 9, 10, 11, 24, 25, 26, 27, 28, 29, 30:
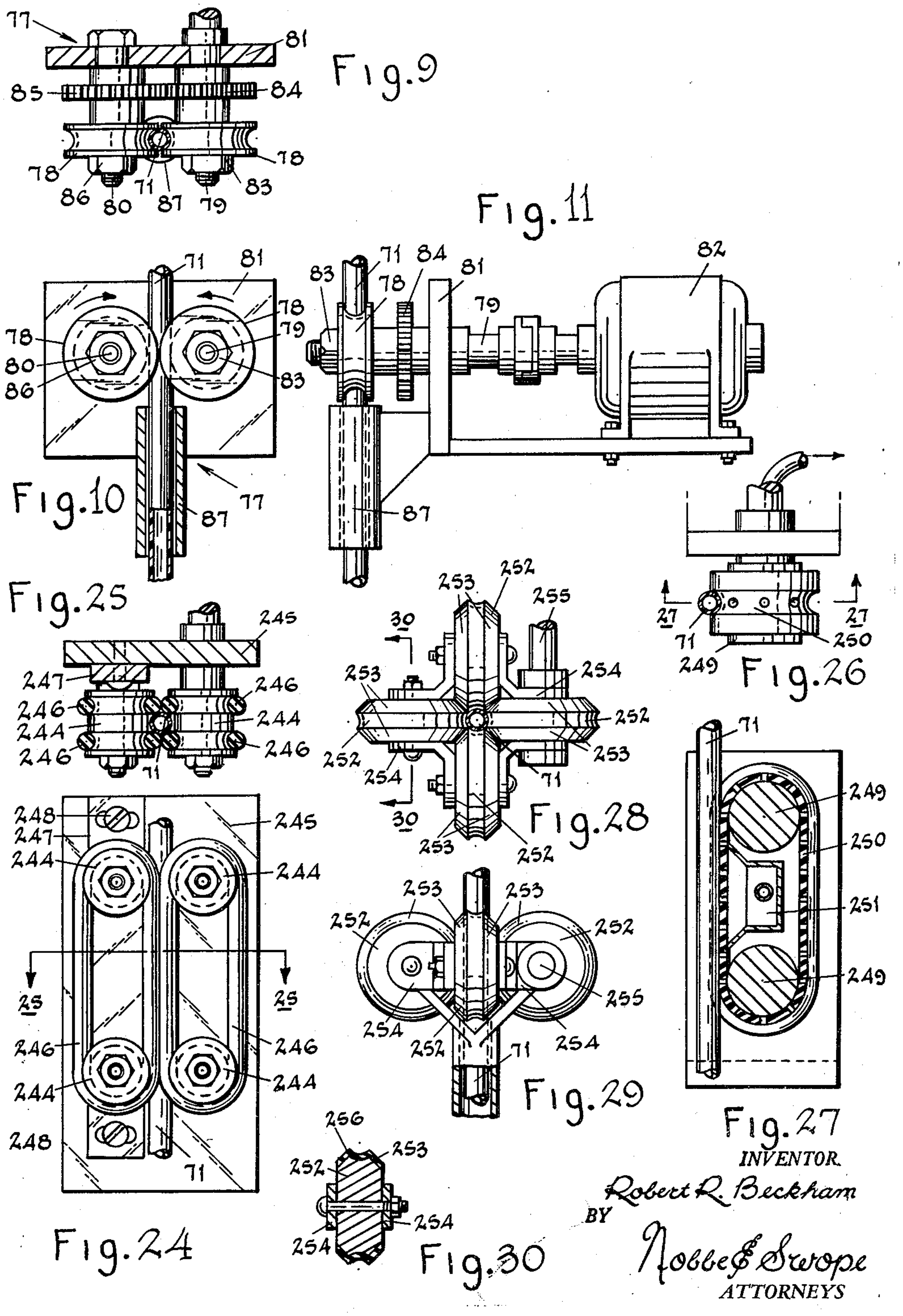
FIG. 9 is a plan view of one embodiment of the desiccant tube feeding device.
FIG. 10 is an elevational view of the desiccant tube feeding device illustrated in FIG. 9.
FIG. 11 is an elevational view of the desiccant tube feeding device showing a drive means therefor.
Figures 18, 19, 20, 21, 22:
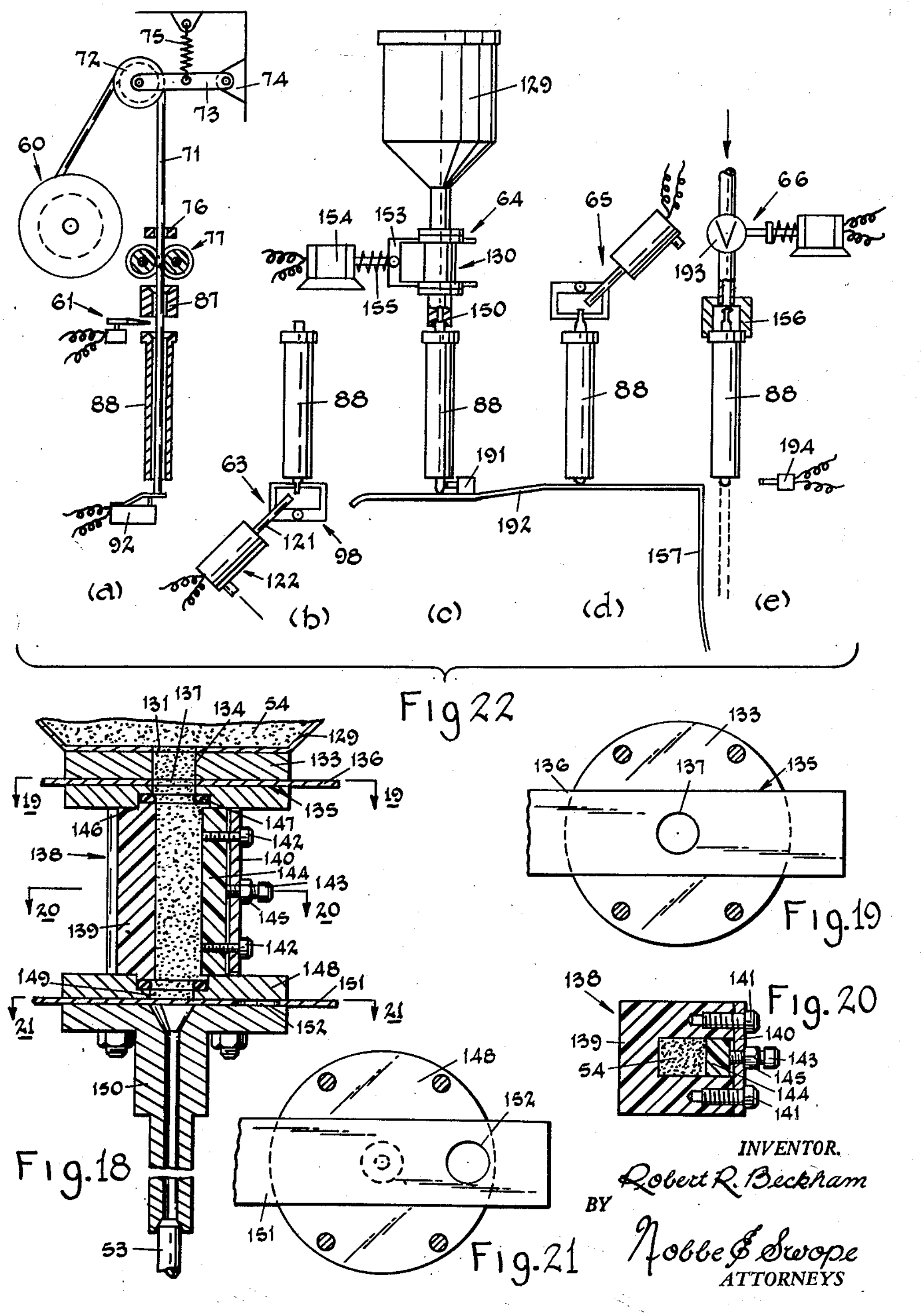
FIG. 18 is a sectional elevational view of a desiccant material feed magazine.
Figure 23:
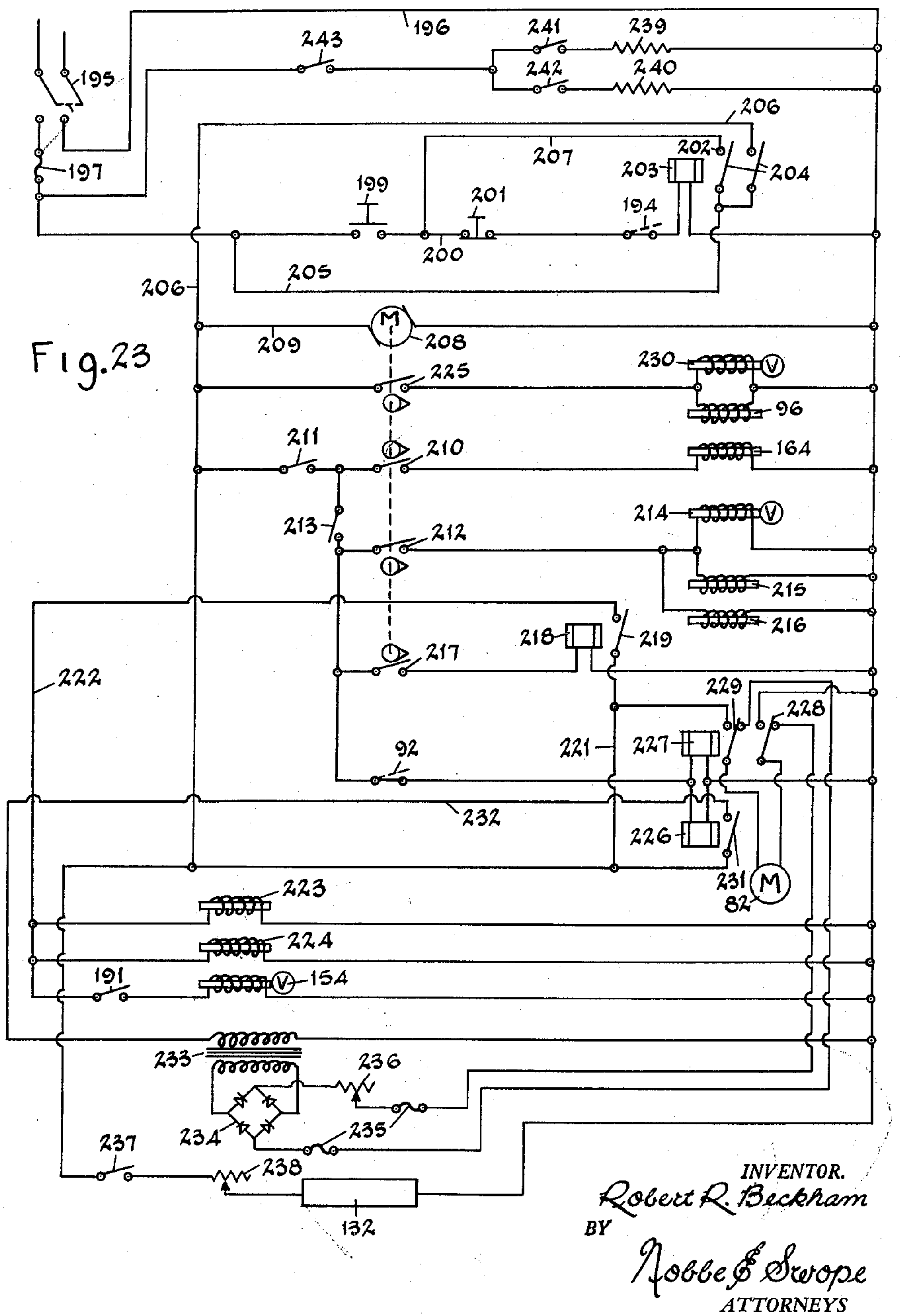

FIGS. 19, 20 and 21 are sectional views of the desiccant material feed magazine taken along lines 19—19, 20—20 and 21—21, respectively, of FIG. 18;

FIG. 22 is a diagrammatic illustration of the operation of the apparatus of the invention;

FIG. 23 is a wiring diagram of electrical circuits associated with the novel apparatus;

FIG. 24 is an elevational view of another embodiment of the desiccant tube feeding device;

FIG. 25 is a sectional view taken along line 25—25 of FIG. 24;

FIG. 26 is a plan view of still another embodiment of the desiccant tube feeding device;

FIG. 27 is a sectional view taken along line 27—27 of FIG. 26;

FIGS. 28 and 29 are plan and elevational views, respectively, of yet another embodiment of the desiccant tube feeding device; and FIG. 30 is a sectional view taken along line 30—30 of FIG. 28.

Figure 1:
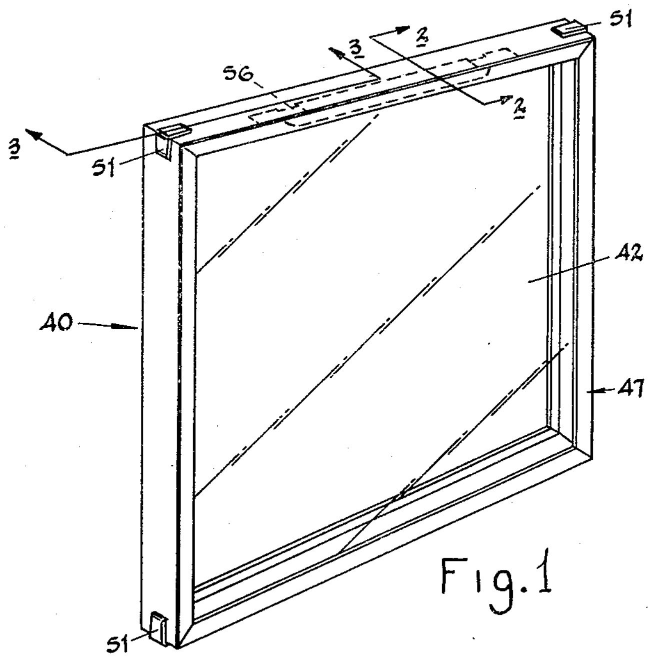
FIG. 1 is a perspective view of a multiple glass sheet glazing unit.
Figures 2, 3, 4:
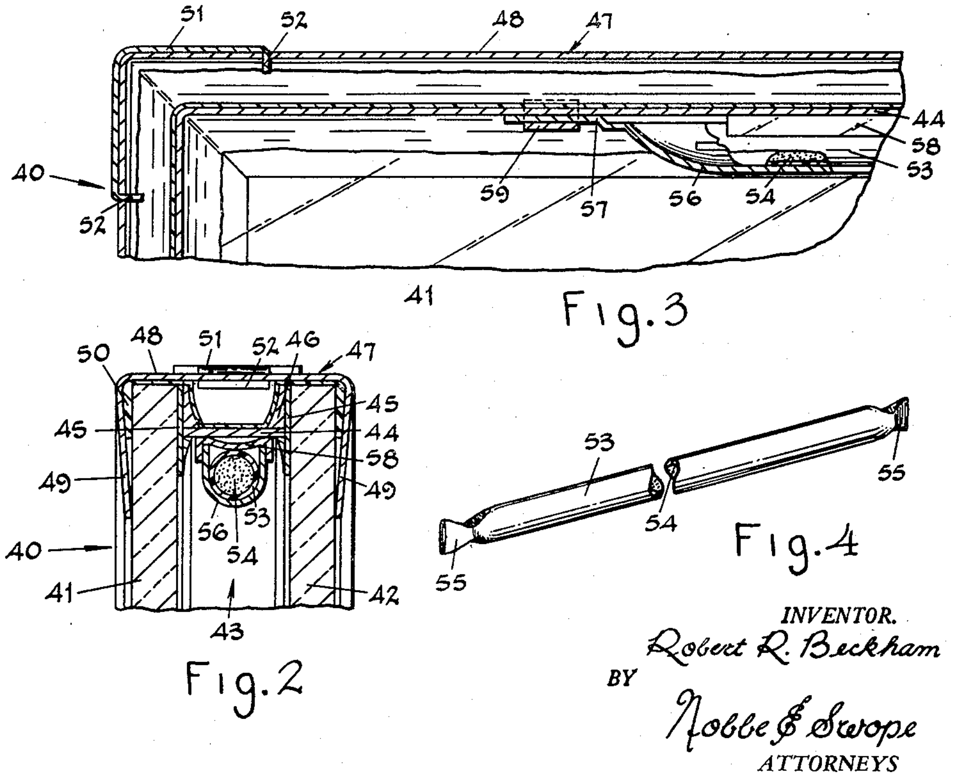
FIG. 2 is a transverse sectional view of a glazing unit taken along line 2—2 of FIG. 1 and showing a dehydration device in position therein.
FIG. 3 is a longitudinal sectional view of the marginal edge portions and dehydration device of the glazing unit taken along line 3—3 of FIG. 1.
FIG. 4 is a perspective view of a desiccant filled tube for use in the dehydration device.

With reference now to the drawings and particularly FIGS. 1 to 3, there is shown a multiple sheet glazing unit 40 composed of a pair of glass sheets 41 and 42 maintained in a substantially parallel, face-to-face relation, and separated from one another to provide an air space 43 therebetween. This space is defined and completely enclosed at the peripheries of the glass sheets by a metallic separator strip 44, located between the glass sheets inwardly of the edges thereof, and bonded to metallic coatings 45 on the glass surfaces through the intermediary of continuous solder fillets 46 extending completely around the periphery of the unit. The separator strip so soldered to the metallic coatings on the glass surfaces serves to hermetically seal the unit, preventing the access of air, dirt, dust and moisture to the enclosed space.

Due to the vulnerability of the glass edges and corners to shock, which can result in breakage of the glass sheets, there is positioned completely around the periphery of the finished unit a special protective means 47. This protective means comprises a plurality of substantially U-shaped metal channels 48, the legs 49 of which are spaced from one another an amount sufficient to provide a clamping force when the channels are in place over the sheet edges and in that way serve to retain the channels in place on the glass sheets. The ends of channels 48 are mitered, as seen best in FIG. 1, so that the channels of adjacent sides of a unit fit together in closely fitting joints at the corners.

As a means of securing the channel-shaped protective means 47 to the margins of the glass unit, a layer 50 of a suitable adhesive material is disposed between the glass and the inner surfaces of the channel and in contact with both. This layer is also useful as a mechanical shock and vibration absorber in that it holds the vulnerable glass edges in a spaced or nonbearing contact relation with respect to the metal channels. Still further, the adhesive provides a barrier to prevent moisture which has been deposited on the outer surfaces of the glass sheets and metal channels from finding its way into the enclosed space.

With the channel members 48 in position covering the sheet edges, the mitered corners of adjacent channels are locked in abutting relationship by L-shaped metal clips 51 having tabs 52 at the ends thereof which are received in similarly shaped openings in the base of the channels 48.

A widely used desiccant carrying structure for such glazing units is a tube 53 as shown in FIG. 4. This tube consists of a substantially cylindrical body made from a thermoplastic material such as a polyethylene type plastic. A desiccant material 54 in granulated or powdered form is deposited within the cavity of the plastic tube, and the ends of the tubes are sealed off as at 55 by the application of heat and pressure in a manner to be described hereinbelow.

The plastic tube 53, after being filled with a desiccant material, is received within a special container 56 which is mounted closely adjacent the inner surface of the separator 44. The container comprises an elongated half-shell metal body provided with mounting tabs 57 at each end. Over the opening of the half-shell there is placed a cover 58 having flanged portions which clampingly engage the walls of the container 56. The tabs 57 are so formed that when they are in a flush mounting relationship with the inner surface of the separator 44, they will hold the container 56 and the cover 58 therefor in a position slightly spaced from the separator strip.

The tabs may be secured to the separator strip in any of a number of different ways. Preferably, however, they should be secured in a manner which will permit the tabs to slide with respect to the separator strip. Thus, as is shown best in FIG. 3, a clip 59 secures tab 57 to separator strip 44 in abutting, longitudinally adjustable relationship. It is necessary to provide for longitudinal adjustment between the members in order to relieve stresses caused by unequal expansion and contraction. These stresses have been found sufficient, in cases where the tab and separator strip were rigidly joined as by soldering, to tear the container away from the separator strip or to cause a severe bowing of the container.

It is to be noted that the cover 58 is slightly shorter in length than the opening of the container 56, leaving an opening between the separator and the desiccant filled plastic tube through which the air contained within the enclosed space may circulate and thereby give up any moisture contained therein to the desiccant material.

Figure 5:
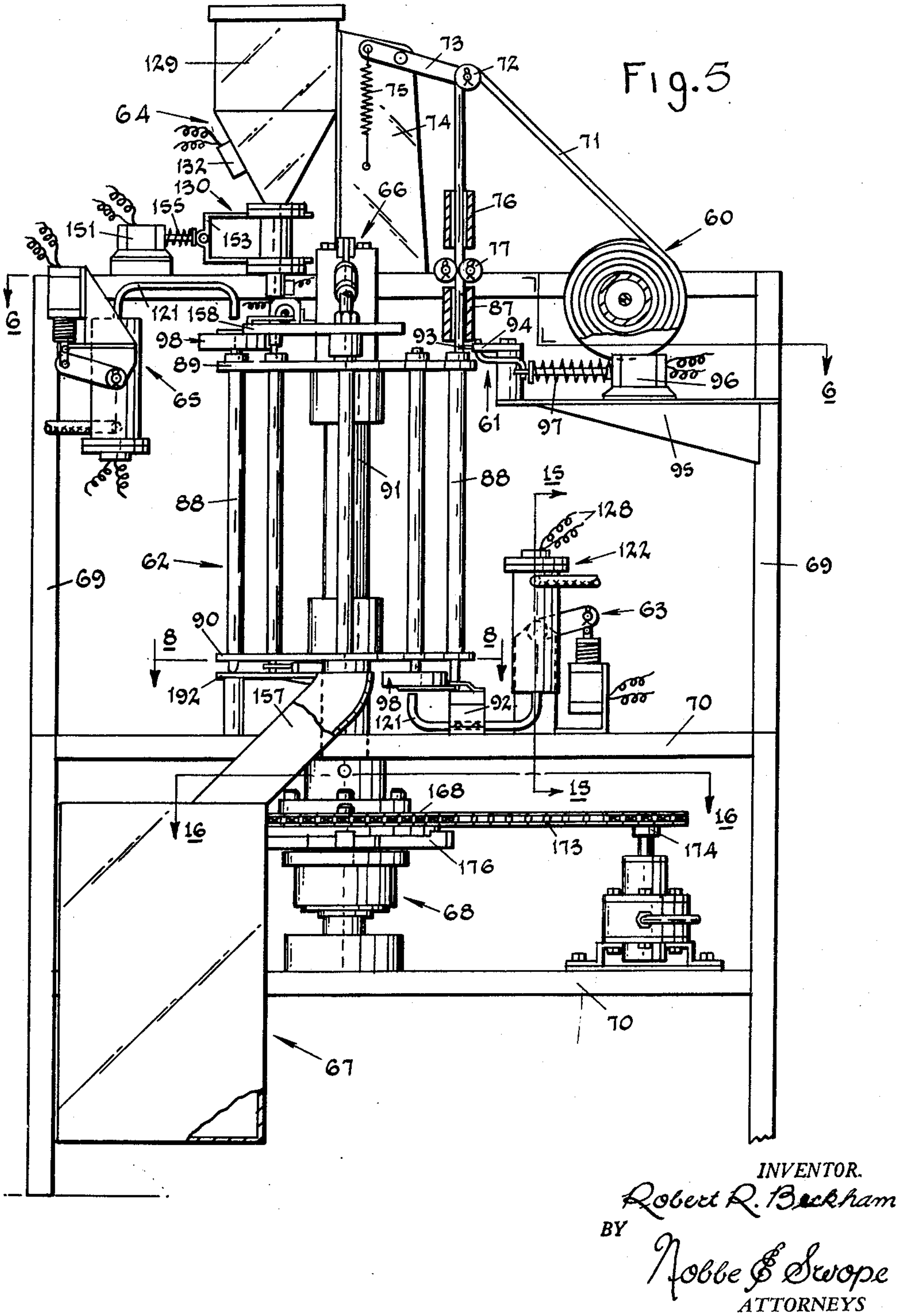
FIG. 5 is an elevational view of the apparatus of the invention.

Referring now particularly to FIG. 5, there is illustrated the apparatus of the invention which comprises broadly a tubing supply 60, a tubing cutting device 61, a transfer magazine 62, lower sealing means 63, desiccant material feeding means 64, upper sealing means 65, ejection means 66, desiccant-filled tubing storage chamber 67 and a drive means 68. In addition to the above-noted items, there is also provided associated electrical apparatus for operating the different items in a timed and properly sequenced manner.

The different parts of the apparatus of the invention are mounted on an upright support framework composed of a plurality of vertically disposed channel irons 69 which are braced by a plurality of horizontal channel irons 70 welded or otherwise suitably secured thereto.

Rotatably mounted on one of the uppermost channels 70 of the support frame is a tubing supply 60 comprising a roll of plastic tubing 71 from which the desiccant tubes 53 are made. The free end of the plastic tubing extends upwardly from the roll and is received in a peripheral groove of a guide roller 72 which is mounted for rotation on a support arm 73. The support arm 73 is pivotally mounted on a vertical mounting plate 74 and a spring 75 attached to the support arm resists downward motion of the roller 72. From the roller, the tubing passes downwardly through a guide tube 76 and into a special tubing drive means 77, the function of which is to pull the tubing off the roll and push it downwardly into operative position without stretching the tubing or destroying its substantially cylindrical shape.

Referring now to FIGS. 9 to 11, the tubing drive means 77 is seen to comprise a pair of rollers 78 mounted for rotation on horizontal shafts 79 and 80 which are carried by a mounting wall 81 secured to the framework of the apparatus. Each of the rollers 78 is provided with a continuous groove about its periphery whereby the rollers in aligned, operative position form a restricted space therebetween, the restricted space being of substantially the same shape as the cross section of the plastic tubing although of a slightly smaller diameter. The shaft 79 is coupled to a drive motor 82 (FIG. 11) mounted adjacent, by which rotative power is supplied for turning the shaft and the roller 78 carried thereby. A nut 83 disposed on the extremity of shaft 79 serves to secure the roller on the shaft.

A gear 84 pinned to the shaft 79 supplies rotative power to a similar gear 85 meshed therewith and carried by the shaft 80. The shaft 80 in turn provides rotative power for the roller 78 carried thereby in the direction opposite to that of its companion roller on the shaft 79. A nut 86 secures the roller on the shaft 80.

As is shown best in FIG. 10, rotation of the two rollers 78 in the direction of the arrows pulls the plastic tubing downwardly through the restricted opening therebetween provided by the grooves in the peripheries of the rollers. When properly adjusted, the rollers will exert sufficient traction power on the outer surface of the tubing and yet insure that no permanent deformation of the tubing will result.

As the plastic tubing is pushed beyond contact with the rollers 78, it enters a second guide tube 87 which directs it into one of a plurality of cylindrical chambers 88 in the transfer device 62. The device 62 comprises an upper circular base plate 89 and a similarly shaped lower plate 90 held in parallel, spaced relation by the cylindrical chambers 88, the chambers 88 being disposed adjacent the peripheries of the plates to provide a substantially drum-shaped body. Referring to FIG. 5, it is seen that the transfer device 62 is incorporated into the apparatus in a manner whereby the chambers 88 are disposed in a vertical position. It is provided with rotative power through a vertical shaft 91 axially secured to the plates 89 and 90. Specific details of the rotation of the magazine and the particular means by which it is accomplished will be described later herein. It is to be noted that on rotation of the transfer device 62, the upper openings of the chambers 88 pass directly beneath the openings in the guide tube 87 and are selectively positionable in registry therewith.

The plastic tubing 71 is thus driven through the guide tube 87 and the chamber 88, meeting no obstructions until it emerges from the lower end of the chamber where it actuates a feed shutoff switch 92. This switch, in a manner later to be described in detail, momentarily stops the feeding of the plastic tubing and initiates the operation of the tubing cutting device 61.

Figures 6, 7, 8:
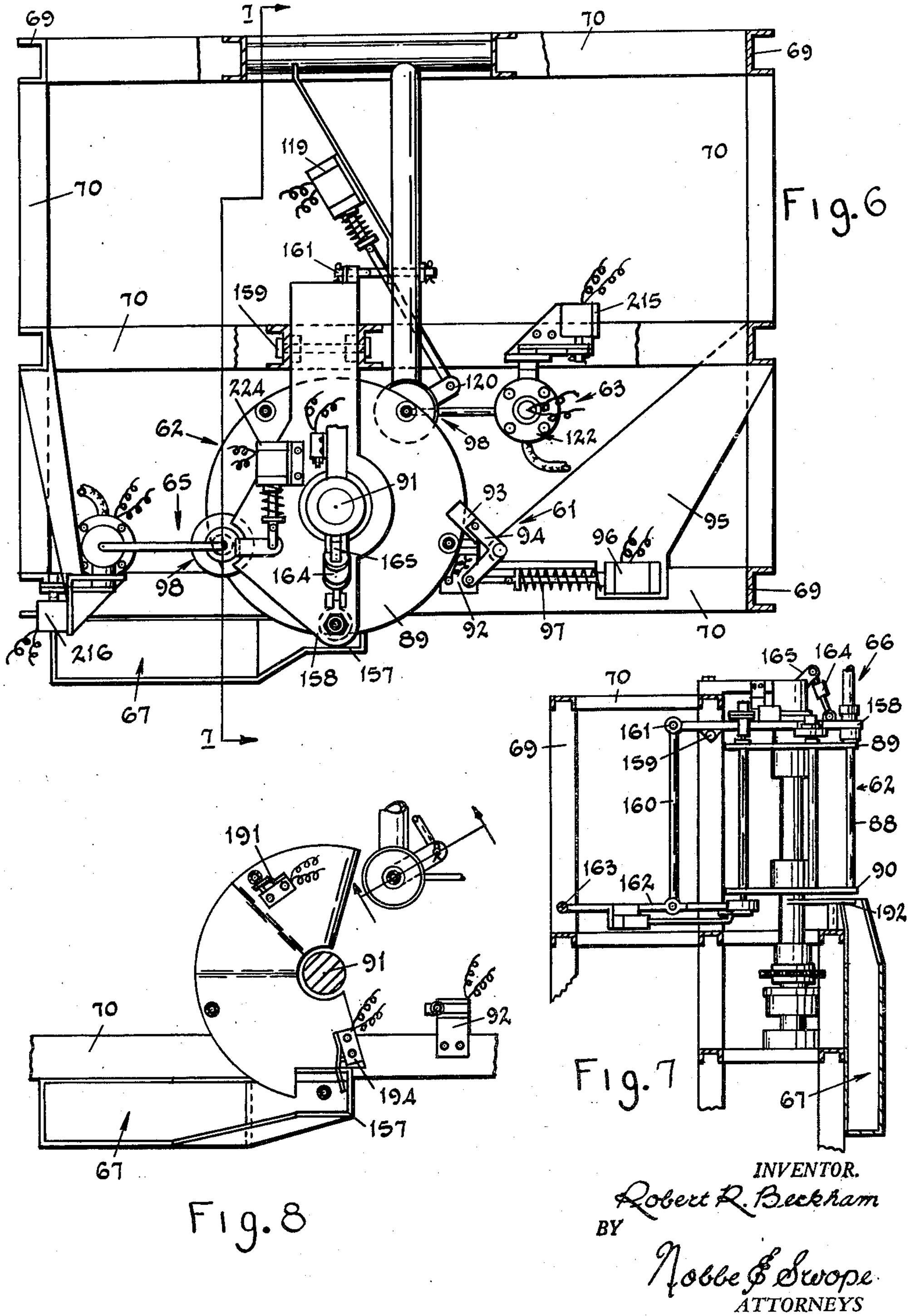
FIG. 6 is a plan view with parts in section, taken along line 6—6 of FIG. 5.
FIG. 7 is an elevational view, partially in section, taken along line 7—7 of FIG. 6.
FIG. 8 is a plan sectional view taken along line 8—8 of FIG. 5.

As seen in FIG. 6, the tubing cutting device 61 comprises a blade 93 carried by an arm 94, the arm being mounted for a horizontal swinging movement on a support base 95. The arm 94 is operably connected to the armature of a solenoid 96 mounted on the base 95 which, on actuation, swings the arm 94 and blade 93 across the lower opening of the second guide tube 87 to thereby cut the tubing 71 to the prescribed length. On de-energization of the solenoid 96, a spring 97 on the armature returns the blade to its original position. It is, of course, fundamental that the chamber 88 be of the predetermined desired length of the cut plastic tube 53, or in fact, slightly shorter.

After the tube 53 has been cut to length, the plates 89 and 90 are indexed in a counterclockwise direction as viewed from above (see FIG. 6), in a way to be set forth in detail later herein, whereby the lower end of the tube is brought into position for sealing by the lower sealing means 63 through the application of heat and pressure.

Figure 12:
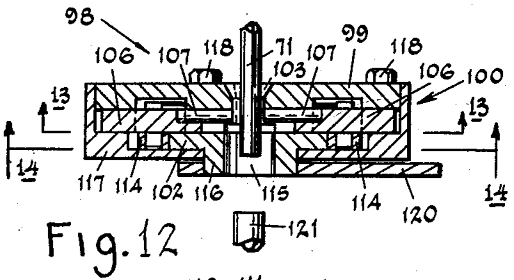
FIG. 12 is a sectional view of a desiccant tube sealing device.
Figure 13:
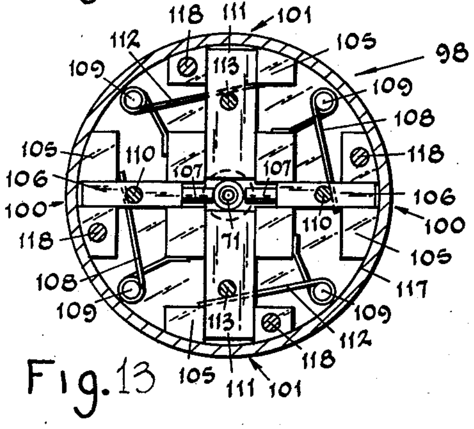
FIG. 13 is a sectional view taken along line 13—13 of FIG. 12.

The pressure applying means 98 of the lower sealing means (FIGS. 12 to 14) includes a base plate 99, a first clamping means 100, a second clamping means 101, and a cam 102. In brief, when the lower end of the plastic tubing 71 is entered into the upper portion of an opening 103 axially located in the plate 99, the tubing is engaged by the first and second clamping means 100 and 101, and by the application of heat and pressure the end of the tubing is closed and fused shut.

The base plate 99 has a centrally located, rectangular depending portion 104 on one surface thereof, the depending portion having two grooves disposed normally to one another and passing through the opening 103 to form a cross-shaped depression in its surface. Additionally, four mounting blocks 105 are disposed on the marginal edge portions of the base plate and on the same side thereof as the depending portion 104. The mounting blocks are separated ninety degrees from one another and have grooves in their surfaces which are aligned with the corresponding grooves in the dependent portion 104.

The clamping means 100 comprises a pair of elongated slides 106 arranged for opposed sliding movement in one of the grooves extending diametrically across the base plate 99. On the inner extremity of each of these slides there is provided a pin 107 which extends longitudinally with respect to the slides. The pins are so located in relation to one another that when they are moved toward one another along the grooves, they will meet in an end contacting relationship.

Each of a pair of springs 108 is mounted on a raised pin 109 depending from the plate 99, one extremity of the springs 108 engaging a protrusion 110 on the surface of the slide 106 facing the plate 99 and the other extremity being anchored against a side of the raised portion 104. In this manner, spring tension continuously and resiliently urges the slides 106 of the first clamping means toward one another or in a direction tending to cause the ends of the pins 107 to contact one another.

The second clamping means 101 comprises a second pair of slides 111, similar to the first slides 106, and similarly disposed in grooves in the blocks 104 and 105 so as to be slidably movable in a direction normal to the path of movement of the slides 106. The slides 111 are rectangular in cross-section, the widest part being approximately the same as the diameter of the opening 103. When the second slides are placed in the grooves and moved therein toward one another, they will contact along a narrow ledge extending across the opening. Springs 112 are mounted on raised pins 109 for engaging posts 113 on the lower surface of the slides 111 to resiliently urge them toward one another.

It is to be noted that the slides are arranged so that when the second slides are in their closed position, the first slides may also be moved into a pin contacting relationship.

On the under surface and toward the outer extremity of each of the slides 106 and 111 are provided rollers or rotatable cam followers 114. The cam 102 is of the circular type having four individual camming surfaces, each providing a gradually increasing extension portion and a sharp dropoff as is shown best in FIG. 14. The cam is also provided with a central axial opening 115 and a hub centered on this opening.

Over the cam 102 there is provided a half-shell cover 117 which holds the base plate 99, the two clamping means 100 and 101, and the cam 102 in a composite unit by means of bolts 118. A central opening is provided in the cover for receiving the hub 116 of the cam which extends therethrough.

Figure 14:
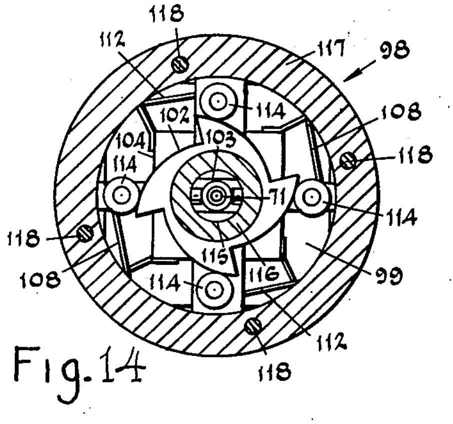
FIG. 14 is a sectional view taken along line 14—14 of FIG. 12.

The operation of the pressure applying means 98 is initiated by the energization of a solenoid 119 (FIG. 6) which actuates a lever 120 connected to its armature and the hub 116, thereby causing the cam 102 to rotate counterclockwise, as shown in FIG. 14, and allow the spring pressure of springs 108 and 112 to move the two clamping means inwardly and engage the lower end of the tube 53, clamping it together. At substantially the same time, heat is applied to the clamped plastic tube through a conduit 121 to fuse it and seal the opening in a way which will be brought out below.

Figure 15:
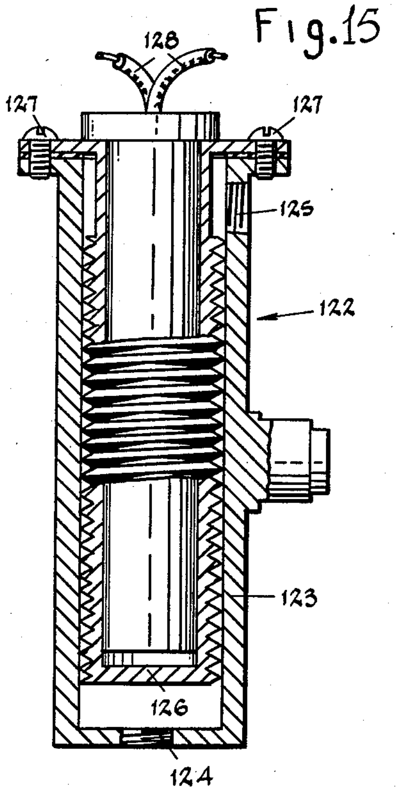
FIG. 15 is a cross-sectional view of an air heater taken along line 15—15 of FIG. 5.

An important adjunct of the lower sealing means 63 is a heating means 122 for directing highly heated air through the conduit 121 onto the lower end of the plastic tube while clamped together by the apparatus described hereinbefore. Referring now to FIG. 15 for the detailed features of this heating means, it is seen to comprise an outer cylindrical shell 123 having one open, flanged end, the other end being closed except for an axially aligned threaded opening 124 therein. There is also provided a threaded entrance opening 125 located in the side wall of the cylinder adjacent the open end. In the open end of the cylinder there is received a hollow elongated core body 126 which is disposed in the cavity of the shell 123 and which is secured to the flanges thereof by screws 127.

In the hollow central portion of the body 126 there is provided a conventional resistance heating element to which electrical power is supplied through wires 128. The periphery of the body 126 is threaded, although there are no receiving threads on the inner wall of the shell 123, the threads merely contacing the smooth inner wall of the shell. The threads provide a tortuous path for air entering the cylindrical shell 123 through the opening 125 and exiting through the opening 124, and thus they insure that the air will have adequate contact with heated core body 126 to elevate its temperature above that necessary to soften the plastic of the tube 53. The heated air is directed from opening 124 through the conduit 121, which is swung into position under the sealing means 63 in a manner that will be brought out later, for directing heated air from the conduit 121 onto the clamped end of the plastic tube (see FIG. 5), completely sealing the lower end of the tube.

Further sequencing of the apparatus brings the plastic tube 53, with its lower end sealed off, to a position underneath the desiccant material feeding means 64 where a measured amount of desiccant material is deposited in the tube. As illustrated in FIGS. 18 through 21, the filling device comprises a desiccant supply receptacle 129 and a measuring magazine 130.

The supply receptacle 129 comprises essentially a hollow enclosure for containing a quantity of desiccant material, and it is provided with a source of dry air at its upper end (not shown) to prevent access of moisture to the dry desiccant material. Moisture, if it did gain access, would of course make the desiccant unfit for use. The bottom portion of the receptacle is cone-shaped with its lower extremity terminating in an opening 131. As shown in FIG. 5, a vibrator 132 is attached to the cone part of the receptacle 129 for vibrating the same during loading of the plastic tube to thereby prevent clogging and caking of the desiccant material.

Immediately below the receptacle and secured to the lower surface thereof is a disk-shaped body member 133 having a centrally disposed opening 134 in registry with the opening 131 in the receptacle. A rectangular slot 135 is provided in the disk-shaped body, parallel to the circular face of the body, for slidably receiving a similarly shaped member 136 therein. This sliding member is provided with an opening 137 of the same diameter as the opening 134, and the two openings can be brought into registry with one another for a purpose that will be set forth below.

Referring particularly to FIGS. 18 and 20, there are shown the detailed features of a measuring device 138 for dispensing predetermined quantities of desiccant material. The device includes an elongated, U-shaped body member 139 provided with a face plate 140 of such dimensions that when placed over the elongated opening of the U-shaped member and secured thereto by screws 141, said opening is closed completely. Secured to the face plate 140 by lugs 142 and setscrew 143 is a spacer block 144 having substantially the same dimensions as the opening in the U-shaped member 139. The lugs 142 are threaded into the spaced block 144 and have unthreaded portions adjacent their heads which allow free rotation within the face plate 140. The setscrew 143 is threaded through the face plate 140 and its end bears against the surface of the spacer block 144. A lock nut 145, threaded on the setscrew 143, can be run up against the spacer block to maintain the desired setting of the setscrew. Thus by properly manipulating the lugs 142 and the setscrew 143, the spacer block 144 can be advanced into or retracted from the opening in the U-shaped body member 139 to thereby vary the volume of the measuring device 138.

One extremity of the body member 139 is rabbeted as at 146 for reception in a similarly shaped opening in the lower surface of the disk-shaped member 133 in a manner whereby the central opening of the measuring device 138 is aligned with the openings 131 and 134 in the receptacle and disk-shaped body member, respectively. Between the rabbeted portions of the measuring device and the body member 133 there is located a sealing gasket 147 to hermetically seal the enclosed space.

A second disk-shaped body member 148, similar in design to the first such member 133, is received on the rabbeted lower end of the U-shaped member 139. The member 148 is provided with an opening 149 which is aligned with the cavity in the member 139 and which extends downwardly through a nozzle portion 150 integral with the said disk member. A second sliding member 151 is received in a slot in the member 148 for movement in a substantially horizontal plane parallel to the movement of the first sliding member 136. The sliding member 151 is also provided with an opening 152 which can be brought into registry with the opening 149 in the disk member 148 by moving the sliding member to the correct position within the slot.

Referring now to FIGS. 5, 18, 19 and 21, it is seen that the two sliding members are secured in a fixed relation to one another by a yoke 153. As FIG. 18 particularly shows, the relationship of the sliding members is such that when the opening 137 of the upper member is aligned with the opening in the disk member 133, the opening 152 in the lower sliding member is disposed well beyond the range of the opening in the disk 148. The purpose of this particular disposition of the sliding members will be set forth at this time. Thus, referring to FIGS. 18 and 22(*c*), the desiccant material 54, following a gravity path, moves downwardly from the receptacle through the openings 131 and 137 and into the cavity within the body member 139. The desiccant material will be retained within the cavity since at this time the second sliding member 151 covers the opening 149. Upon energization of a feed solenoid 154, the sliding members 136 and 151 are moved to the left as shown in FIG. 18, this movement serving to close the opening 134 and to move the opening 152 into registry with the opening 149 in the second disk-shaped body member 148, thereby permitting the desiccant material within the U-shaped body member to move through the nozzle 150 and thence into the plastic tube 53. The amount of desiccant loaded each time is substantially constant, it being the amount held between the two sliding members 136 and 151.

Upon de-energization of the solenoid 154, a spring 155 returns the yoke 153 and the sliding members 136 and 151 to their original position as shown in FIG. 18. Desiccant material 54 then descends from the receptacle 129 through the opening 134 to refill the cavity within the U-shaped body member 139. During the filling operation, the vibrator 132 is energized to facilitate the feed of the desiccant material as noted above.

Further indexing of the tube transfer device 62 brings the filled tube 53 into position under the upper tube sealing means 65. The upper sealing means is identical in construction and operation with the lower sealing means 63, the only difference being that it is positioned so as to operatively engage and seal off the upper end of the plastic tube. In view of the functional and structural similarities of the two devices, a detailed description of the upper tube sealing device will not be given.

Still further indexing of the tube transfer device 62 brings the tube 53, containing the desiccant material and having both ends sealed, into position for removal from the cylindrical chamber 88 and subsequent storage in the tube storage chamber 67. Removal is accomplished by directing compressed air downwardly onto the upper end of the desiccant-filled plastic tube from a hood 156 connected to a supply of compressed air (not shown), the hood being disposed above and in surrounding relationship to the upper end of the tube 53. The compressed air causes the plastic tube to move downwardly, out of the cylindrical chamber 88 in which it is carried, and into a chute 157 which leads it along a gravity path into the storage chamber 67.

Referring now to FIGS. 5, 6 and 7, it is seen that the upper sealing means 65 and the ejection hood 156 are carried by a flat, substantially horizontally disposed table 158 which is pivotally mounted for vertical movement about a fulcrum pivot 159 secured to and extending between two centrally located vertical channel irons 69.

The portion of the table 158 extending beyond the fulcrum pivot 159 is pivotally connected to a vertical extension member 160 through a second pivot 161, the extension member extending downwardly to pivotally engage a lower table 162 intermediate the ends thereof. The lower table 162 is also disposed in a substantially horizontal position. The lower table 162 carries the lower sealing means 63 at its one end, the lower sealing means being disposed underneath the lower plate 90 and in registry with the lower openings of the chambers 88 as they are moved in a sequential manner therepast. The table 162 is pivotally attached to one of the vertical members 69 for vertical movement about a third pivot 163.

Referring specifically now to FIG. 7, it is seen that downward movement of the upper table 158, as will occur when the upper tube sealing means 65 and the ejection hood 156 move into operative position, causes the extension bar 160 to rise which in turn raises the lower table 162 by pivoting it about the pivot 163, thereby bringing the lower sealing means 63 upwardly into operative position.

The downward movement of the upper table 158 is produced by the energization of a solenoid 164 acting through a linkage 165 connected to the upper surface of the table 158. De-energization of the solenoid causes the linkage, through a spring (not shown), to draw this table and its associated apparatus upwardly out of operative position. This upward movement, at the same time, moves the extension member 160 downwardly, causing the table 162 to rotate clockwise about the pivot 163 (FIG. 7) and thereby to remove the lower sealing means from its operative position.

Figure 16:
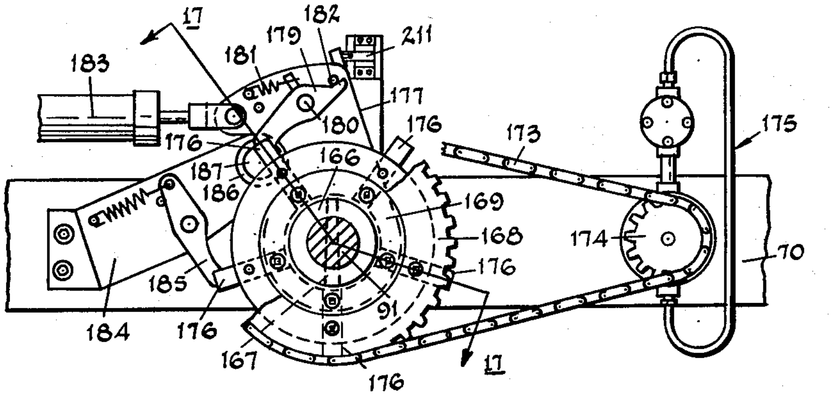
FIG. 16 is a plan view, partially in section, of an indexing device taken along line 16—16 of FIG. 5.
Figure 17:
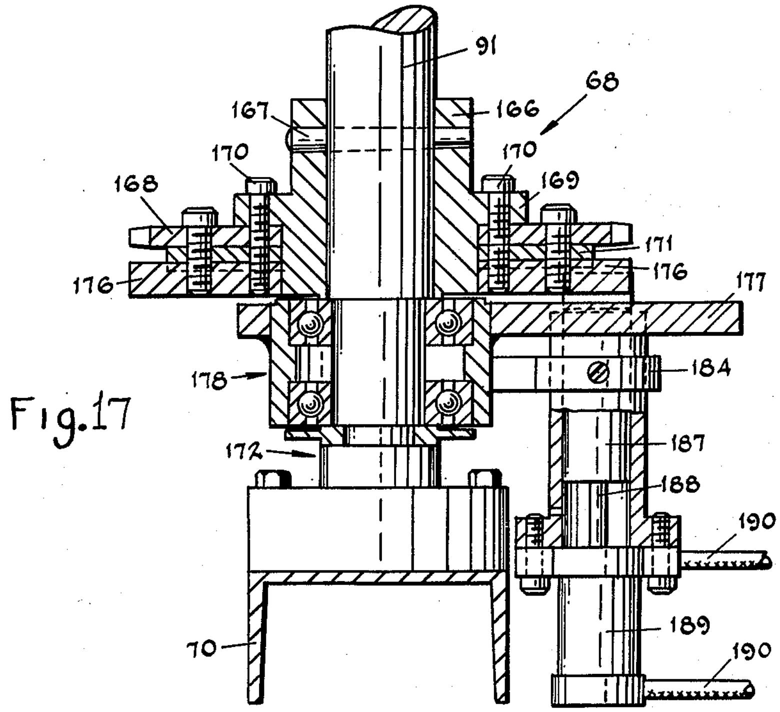
FIG. 17 is an elevational view, in section, taken along line 17—17 of FIG. 16.

As mentioned above, the tube transfer magazine 62 is rotated about a vertical axis in a sequential manner to bring each of the cylindrical chambers 88 into operative position with respect to the different elements of the apparatus in order that they may perform the required operations on the plastic tubing. This sequential, periodic rotation of the device 62 is controlled by an electrical timing circuit, to be discussed later, which causes the apparatus as shown in FIG. 6 to rotate in a counterclockwise direction and to be selectively positioned in a plurality of predetermined positions. The apparatus for providing the sequential rotation of the tube transfer device 62 is illustrated in FIGS. 16 and 17. Referring particularly to FIG. 17, the apparatus is seen to comprise a flanged hub 166 received upon the lowermost end portion of the shaft 91 and pinned thereto by a pin 167. A sprocket 168 is received on the hub 166 and secured in a contacting relationship to the flange 169 of the hub by screw members 170. Immediately below the sprocket, and also received upon the hub 166 in contacting relationship with the sprocket, is a mounting plate 171 having a diameter somewhat less than that of the sprocket and provided with openings for receiving the screw members 170 therein to secure the plate and sprocket together. The lower extremity of the shaft 91 is journalled as at 172 for rotation.

The sprocket 168, as shown best in FIG. 16, is connected by a chain 173 to a driven sprocket 174 operably connected to a suitable braking means 175, preferably of the hydraulic inertial type. It is the purpose of the hydraulic inertia means to provide a smooth and even motion to the sprocket 168 and thereby to the motion of the chambers rotated by the shaft 91.

The mounting plate 171 is provided on its lower surface with a plurality of equally spaced pawls 176 secured to the plate so as to extend along diameters of the plate with their ends substantially coextensive with the ends of the teeth of the sprocket 168. The number of these pawls is dependent upon the number of operations to be accomplished by the desiccant tube filling apparatus, the number being five in the present embodiment.

Between the extremity of the shaft 91, journaled at 172, and the hub 166, there is a turned down portion on which a drive plate 177 is journaled as at 178 for rotation in a substantially horizontal plane about the shaft 91 as an axis. On the upper surface of the drive plate, adjacent the extremity thereof, is disposed a ratchet 179, pivotally mounted on a pin 180 and spring loaded by a spring 181 to hold an extremity thereof against a stop 182. The other end is so located as to engage the ends of the pawls 176 as shown in FIG. 16, and upon movement of the plate 177 toward the left, the sprocket 168 is turned in a counterclockwise direction as there shown, thus turning the transfer device 62 in a counterclockwise direction when viewed from above. The power for driving the plate 177 is provided by a hydraulic or pneumatic cylinder 183 mounted adjacent, the piston of which is suitably connected to the drive plate 177.

A second mounting plate 184 is secured to the upper surface of one of the horizontal channels on which the shaft is journaled. A backup stop ratchet 185 is pivotally mounted on the upper surface of the plate 184 and spring loaded for holding it against a stop in the manner shown in FIG. 16. When the drive ratchet 179 has moved pawl 176 a specified distance, another pawl in advance of the first mentioned driven pawl is engaged by the backup pawl 185 to prevent any reverse motion of the mounting plate 171 while the drive plate 177 is being driven to the right.

An opening 186 is provided in the second mounting plate 184 for receiving a positioning member 187 therethrough, the positioning member extending upwardly a sufficient distance to enable it to engage the leading edge of a pawl 176. As shown in FIG. 17, the member 187 is rigidly attached to a piston rod 188, the piston of which operates within a hydraulic cylinder 189. To move the positioning member upwardly and downwardly, the hydraulic cylinder is supplied with a suitable hydraulic fluid through pipe members 190 in a manner well known in the art. The purpose of the positioning member is to provide a seat against which each pawl 176 will abut at the forwardmost position to which it is driven by the ratchet 179, thus insuring a positive positioning of the chambers 88 within the close limits of variation permissible to accomplish the purposes of the invention. The positioning member is withdrawn downwardly immediately prior to the initiation of a cycle of movement of the sprocket 168 in order to permit the pawl 176 to pass thereover for subsequent engagement with the backup stop ratchet 185.

Before entering into an examination of detailed features of the electrical circuit associated wiht the apparatus discussed herein, a discussion of the general operation of the complete apparatus, describing the relation of the different operations accomplished, will be undertaken.

Turning now to FIG. 22, there is set forth therein a diagrammatic illustration of the different steps accomplished by each of the major parts of the apparatus of the invention. Thus, in FIG. 22(*a*) there is shown the feeding of the plastic tubing 71 into the cylindrical chamber 88. Upon reaching the lower extremity of the cylindrical chamber, the tubing actuates a switch 92 which stops the tube feed drive motor and energizes the tubing cutting device 61 for cutting the tubing to its measured length.

Upon completion of the plastic tubing cutting operation, the tube transfer magazine 62 is indexed to a position where the lower end of the tube can be sealed by the lower sealing means 63 as shown in FIG. 22 (*b*).

With the lower end of the tube sealed and the upper end open, further indexing of the transfer magazine places the upper end under the desiccant material feeding means 64 as shown in FIG. 22(*c*). On reaching the proper position beneath the filling device, a feed control switch 191 is actuated by contact with the lower end of the tube 53, thereby energizing the feed solenoid 154 to deposit a measured amount of desiccant into the plastic tube.

When the tube filling is completed, further indexing of the transfer device brings the filled tube into the position shown in FIG. 22(*d*) where its upper end is sealed shut through the action of the upper tube sealing means 65. During movement from the filling position to the upper end sealing position, a lower support surface 192 has engaged and moved the filled plastic tube slightly upwardly in order to facilitate the sealing of the upper end.

Finally, the filled, sealed plastic tube is indexed to the ejection position at which time the solenoid 164 is energized. The solenoid 164 causes ejection hood 156 to move into operative position and also actuates a valve 193 directing a blast of air vertically downward onto the plastic tube, causing it to move out of the chamber 88, into the chute 157 and thence into the storage chamber 67. This operation is illustrated in FIG. 22(*e*).

The ejection of the tube 53 from the cylindrical chamber and its passage into the storage chamber 67 is the final operation on the plastic tube by the apparatus of the invention. Further indexing of the tube transfer device 62 brings the cylindrical chamber 88, from which the filled plastic tube has just been ejected, into position for receiving a new length of empty plastic tubing as in FIG. 22(*a*).

A safety device is inserted between the final stage of one cycle as shown in FIG. 22(*e*) and the first stage of the next cycle as shown in FIG. 22(*a*) to prevent jamming of the cylindrical chamber 88 if for any reason a filled tube should fail to be ejected therefrom. Thus a switch 194 is provided on the upper portion of the support surface 192, the switch being positioned so as to be actuated by the lower end of a plastic tube extending from the bottom of the chamber 88. Actuation of this switch prevents further sequencing of the tube transfer device 62 until the chamber 88 is emptied. The importance of preventing the jamming of the apparatus that would result from trying to force a piece of plastic tubing into a cylindrical chamber 88 already containing a filled plastic tube will be readily appreciated.

In FIG. 23 there is illustrated a diagram of the wiring circuit of the associated electrical apparatus for initiating and timing the different operations of the apparatus in proper sequence. Through a line switch 195, one side 196 of a single phase power supply is provided for all the electrical apparatus. The other side of the power supply comes through the line switch 195 and fuse 197, and a wire 198 to a start button 199 which, when closed, provides a circuit through wire 200, stop switch 201 (closed) and switch 194 (closed) to energize a circuit-held relay 203, the other side of which is connected to the 196 side of the line. On energization of the relay 203, its corresponding points 204 close, one of them providing a circuit from the 198 side of the line through wire 205 and wire 206 to provide a voltage supply to the remainder of the electrical apparatus. The second of the switch points 204 provides a holding circuit from the 198 side of the line through wire 205, contacts 202 and wire 207 for the purpose of keeping relay 203 energized after release of the start button 199.

It will be apparent to one skilled in the art that either depression of the stop button 201 or opening of the switch 194 (which will be shown later) will de-energize the relay 203, thereby opening points 204 and removing electrical power from the entire apparatus.

On closing of the contacts 204, a motor 208 of a timing relay is connected to the 206 side of the line through wire 209, while the other side of the motor is connected directly to the 196 side of the line. Energization of the motor 208 causes a series of cams to turn, the cams, in turn, actuating a plurality of contact points for energizing a series of electrical items in a timed sequential manner.

The first timer switch point to close after energization of the timer motor 208 is the point 210 which, on closing, provides a circuit from the 206 side of the line through switch 211 (closed) to energize the solenoid 164, the other side of which is connected directly to the 196 side of the line. This solenoid serves to bring the different elements of the lower sealing and tube ejection apparatus into operative position as discussed above and shown in FIGS. 6 and 8.

Timer point 212 next closes to provide a circuit from the 206 side of the line through switch 211, and through switch 213 which has been closed by the above described action of the solenoid 164, in order to energize the tube ejection valve solenoid 214, the upper hot air solenoid 215 and the lower hot air solenoid 216. Thus, with these three solenoids energized simultaneously, a completely finished tube which is in the position shown in FIG. 22(*e*) is ejected, and tubes 53 have heat applied to the upper and lower ends as shown in FIGS. 22(*b*) and (*d*).

Simultaneously with the closing of timer point 212, the timer point 217 closes to provide a circuit from the 206 side of the line, thereby energizing relay 218, the other side of which is connected directly to the 196 side of the line. Energization of the relay 218 closes its corresponding point 219 to provide a circuit from the 206 side of the line through wire 220, wire 221, relay point 219 and wire 222, thereby energizing the upper tube clamp solenoid 223, the lower tube clamp solenoid 224 and the fill valve solenoid 154, the latter being under the control of the feed control switch 191. Energization of these solenoids serves to actuate the clamping means for both the upper and lower sealing means, and also to actuate the filling material feeding means 64, provided the feed control switch 191 has been closed by a tube in position to be filled.

At the time that switch 213 is closed by the rocker table, which in turn is actuated by the solenoid 164, a circuit is made available from the 206 side of the line through switches 211 and 213 and the feed shutoff switch 92 to simultaneously pick up a tube feed motor relay 227 and a time delay relay 226, the other sides of which relays are connected to the 196 side of the line. Energization of the relay 227, provides a circuit from the 206 side of the line, through wires 220 and 221 and relay point 229, to one side of the plastic tubing feed motor 82, the other side of which is connected through the second point 228 of relay 227 directly to the 196 side of the line.

The motor 82 continues to feed the tubing until its lower extremity extends from the cylindrical chamber of the magazine whereupon it contacts the switch 92 and opens the circuit to drop motor relay 227 and take electrical power off the drive motor 82.

When relay 227 is energized, relay 226 is also energized, connecting line 206 through wire 220, relay point 231 (now closed) and wire 232 to the primary side of a transformer 233, the other side of which is connected directly to the line 196. The output of the transformer is impressed upon a full-wave rectifier 234 whose D.C. output (suitably fused as at 235 and provided with a limiting resistor 236) is available to the motor 82 when the relay 227 is de-energized, the output being made available through the points 228 and 229 which are then in the position shown in FIG. 23. When the D.C. voltage is impressed upon an A.C. induction type motor such as the motor 82, it acts as a so-called dynamic braking device. This supply of direct current is made available to the motor 82 for a short, but definite, time after the motor is disconnected from the A.C. power since the relay 226 is a time delay relay, meaning that after it is de-energized, a specified time elapses before the relay points disengage and move to the de-energized position. The provision of a quick stop for the tubing feed drive system, as by dynamically braking motor 82, is important since, due to the flexible nature of the plastic tubing, the motor will override if not stopped quickly when the end of the plastic tubing contacts the feed shutoff switch 92, thereby causing a jamming of the tube in the magazine and preventing a satisfactory filling of the tube.

At the extreme bottom of the wiring diagram in FIG. 23, there is shown the vibrator 135 which is operably connected to the receptacle 132 for breaking up any desiccant material that may tend to clump together during the feeding operation, and in this way to obtain an even flow of the desiccant material into the tube 53. The electrical control for this vibrator is a manual switch 237 which provides a circuit from line 206, switch 237, and control rheostat 238, the other side of the vibrator being directly connected to the 196 side of the line.

At the top of the wiring diagram of FIG. 23 there is to be found an upper sealing means heating element 239 and a lower sealing means heating element 240 connected through thermostatic control switch 241 and 242, respectively, to the 196 side of the line, both heating elements being controlled by a manual switch 243. These heating elements are controlled by a manual switch since it takes a short while for them to attain their normal operating temperature. It is desirable, therefore, to be able to initiate the heating of these elements before operation of the remainer of the apparatus is begun so that the air for sealing the plastic tubing can be elevated to a sufficiently high temperature for proper operation.

Further rotation of the timer motor 208 will cause the cam operated points 210, 212 and 217 to open and release the respective relays, solenoids and valve solenoids. At this time, timer point 225 is closed, providing an energizing circuit to the tubing cutting solenoid 96 and to a valve solenoid 230 which provides compressed air to the pneumatic cylinder 183 and to the position cylinder 189 for sequencing the magazine 62. Switch 211 is opened as the pneumatic cylinder 183 advances, disrupting all circuits passing therethrough as a safety measure during the advance of the magazine 62, and then is closed as the magazine reaches its proper position for the next tube processing operation. Thereafter, if the stop button 201 has not been tripped, deenergizing relay 203, and if the safety switch 194 has not been tripped, the timer motor 208 will continue running to institute another cycle of operations.

Although the plastic tubing feeding means 77 illustrated in FIGS. 9 to 11 is fully satisfactory, several modified forms of this apparatus have been found to be equally satisfactory. These modifications are illustrated in FIGS. 24 through 30 and will be discussed at this time.

The embodiment of the tube feeding device shown in FIGS. 24 and 25 comprises four rollers 244, each of which has a pair of continuous peripheral grooves thereon. The rollers are mounted for rotation on a vertical wall member 245, preferably in vertically and horizontally aligned pairs, the upper pair of rollers being disposed relative to one another so that the peripheral grooves of the pair provide two restricted passages therebetween, the lower pair being similarly mounted with its restricted passages disposed vertically below and in registry with the restricted passages of the upper pair. About each vertically aligned pair of rollers are disposed two continuous belt members 246 which ride in the grooves thereof and provide, with the adjacent pair of rollers, as shown best in FIG. 25, a single restricted area through which the plastic tubing 71 passes. Conventional O-shaped rubber rings have been found satisfactory for use as belt members 246.

In practice, only one of the rollers 244 is driven, the others being driven in turn by the belts 246 and the plastic tubing. When the plastic tubing is introduced into the restricted opening, frictional engagement with the moving belt member serves to drive the plastic tubing into and along the restricted passage between the belt members by exerting a smooth, even, gripping force on the plastic tubing outer surface. This type of drive prevents the tubing from becoming stretched or squeezed out of shape and perhaps damaged to an extent where it would be unfit for use.

As is shown in FIG. 24, the rollers at the left are separately mounted on a plate 247 which in turn is mounted on the wall member 245 by screws 248 which pass through slotted openings in the plate, permitting adjustment of the bar and the rollers carried thereby in relation to the other rollers and in this way providing a uniform gripping of the plastic tubing throughout the full length of contact of the belt members 246.

Another form of plastic tubing feed device is illustrated in FIGS. 26 and 27. This device comprises a pair of rollers 249 mounted on a vertical mounting surface for rotation in an aligned relationship. The peripheries of these rollers are each provided with a continuous groove and a continuous drive belt 250 of a resilient, deformable material encircles the pair of aligned rollers and rests within the grooves. Along substantially the centerline of the belt 250 there are provided a plurality of spaced openings. In the space between the rollers there is disposed a cowl means 251, held in a closely spaced relationship to the inner surface of the center portion of the belt and in communication with some of the spaced openings therein, and through which a strong vacuum is provided by conventional means (not shown).

In operation, the plastic tubing is placed along the line of the openings on the moving belt 250 and the reduced air pressure, or suction on the opposite surface of a portion thereof causes the tubing to be held against the belt and moved along therewith in the direction of the belt movement.

Still another embodiment of the tubing drive device is illustrated in FIGS. 28 to 30. It comprises four peripherally grooved rollers 252 disposed substantially in the shape of a cross as shown in FIG. 28, the grooves of the associated rollers forming a single restricted passage. The edges of each of the rollers are beveled as at 253 in order that they may be brought into contact with the similarly beveled edges of adjacent rollers and all be driven in the same direction by any one of the rollers. Four substantially L-shaped brackets 254 are provided for mounting the shafts of rotation of the rollers in the unitary cross-shaped arrangement described above. A single drive shaft 255 is provided for driving one of the rollers, that roller in turn driving the other rollers by frictional contact of their peripheral tapered edges.

Although the rollers 252 can be made from a number of different materials, best results have been obtained by making the main body portion of metal and covering the peripheral surfaces with a layer 256 of a material having a relatively high coefficient of friction, such as rubber and the like, as shown in FIG. 31.

Upon introducing the plastic tubing into the restricted opening between the rollers 252, it is engaged by the side walls of the grooves of the moving rollers and pulled therethrough, a substantially equal force being exerted on all sides of the tubing to thus avoid undue distortion or collapse thereof.

It is to be understood that the forms of the invention herewith shown and described are to be taken as illustrative embodiments only of the same, and that various changes in the shape, size and arrangement of parts may be resorted to without departing from the spirit of the invention.

I claim:

1. Apparatus for producing a sealed tube containing granular material comprising, in combination, means for advancing hollow tubing from a continuous supply along a definite path, elongated chamber means of predetermined length disposed in said path for receiving the tubing, cutting means for severing the tubing substantially at the entrance to said chamber means when said tubing has advanced through said chamber means, first closing means for sealing one end of the severed length of tubing, granular material supply means for depositing granular material in the tube through the remaining open end, second closing means for sealing said remaining open end, and means for transferring the filled, sealed tube from said chamber into a storage receptacle.

2. In apparatus for producing a sealed tube containing granular material as claimed in claim 1, wherein said means for advancing the tubing comprises rotatable drive wheels disposed relative to each other in a manner to form a restricted opening between their adjacent peripheries for receiving the tubing and advancing said tubing along said path.

3. In apparatus for producing a sealed tube containing granular material as claimed in claim 1, wherein said granular material supply means comprises a measuring magazine having an adjustable capacity for depositing a predetermined quantity of granular material into said tube.

4. In apparatus for producing a sealed tube containing granular material as claimed in claim 1, wherein said transferring means comprises a conduit supplying compressed air to said chamber for ejecting the filled, sealed tube, and a chute for carrying the ejected tube from said chamber to said storage receptacle.

5. In apparatus for producing a sealed tube containing granular material as claimed in claim 1, wherein automatic means are provided for sequentially moving said elongated chamber means and the severed length of tubing contained therein into operative relation to said first closing means, said granular material supply means, said second closing means, and said transferring means.

6. In apparatus for producing a sealed tube containing granular material as claimed in claim 1, wherein said elongated chamber means comprises a plurality of receiving chambers mounted upon a substantially drum shaped body member disposed for rotation about an axis, each chamber adapted to be moved into the path of the advancing tubing in a timed sequential manner.

7. In apparatus for producing a sealed tube containing granular material as claimed in claim 6, in which the means for moving the elongated chambers comprises selective positioning means for accurately positioning the receiving chambers and tubing contained therein into successive operative relation to said first closing means, granular material supply means, second closing means, and transferring means.

8. Apparatus for producing a sealed tube containing granular material comprising, in combination, means for advancing hollow tubing from a continuous supply along a definite path, said tubing advancing means comprising rotatable drive wheels mounted so as to form a restricted opening between their adjacent peripheries for receiving said tubing and causing said tubing to advance along said path, elongated chamber means of predetermined length disposed in said path for receiving the tubing, cutting means for severing the tubing substantially at the entrance to said chamber means when said tubing has advanced through said chamber means, said cutting means comprising a blade swingably mounted adjacent said tubing and means adapted to swing said blade through an arc, first closing means for sealing one end of the severed length of tubing, said first closing means comprising means for clamping the end of the length of tubing closed and means for applying heat to the end of the tube while in the clamped position, granular material supply means comprising a measuring magazine having an adjustable capacity for depositing a predetermined quantity of granular material in the tube, second closing means for sealing the remaining open end of the tube after the granular material is entered therethrough, and means for transferring the filled, sealed tube from said chamber into a storage receptacle, said transferring means comprising a conduit for supplying compressed air to said chamber to eject the filled, sealed tube, and a chute for conveying the ejected tube from said chamber to said storage receptacle.

9. Apparatus for producing a filled plastic tube of predetermined length having its ends sealed comprising, in combination, a rotatable spindle having a continuous supply of plastic tubing wound thereon, means for pulling the free end of said plastic tubing from said spindle and directing it downwardly along a definite path, a plurality of vertically disposed elongated chambers of predetermined length carried by a drum shaped support means mounted for rotation about a substantially vertically disposed axis, means for rotating said support means and chambers carried thereby through a plurality of selective positions whereby each of said chambers is successively disposed in the path of movement of the advancing plastic tubing for receiving said plastic tubing, severing means disposed adjacent the upper end of the chamber into which the plastic tubing is being directed for severing said tubing when said tubing has advanced through said chamber, means actuated by the end of the plastic tubing emerging from the lower end of said chamber for operating said severing means, first clamping and heating means for sealing the lower end of the severed tube, means for dispensing a measured amount of granular material along a gravity path into the upper open end of said tube after said lower end has been sealed, second clamping and heating means for sealing the upper end of the filled tube, and pneumatic ejection means for discharging the filled, sealed tube from said chamber into a storage receptacle.

10. In apparatus for producing a filled plastic tube as claimed in claim 9, wherein said means for pulling the free end of the plastic tubing comprises rotatable drive wheels relatively positioned so that the peripheries of said wheels provide a restricted passage for grippingly receiving said tubing therein, and means for rotating at least one of said wheels.

11. In apparatus for producing a filled plastic tube as claimed in claim 10, wherein said drive wheels each have a spaced pair of continuous grooves in their peripheries, and continuous belt members disposed in said grooves about vertically aligned pairs of said drive wheels, the exposed surfaces of said belt members providing a single restricted passage for receiving said tubing therebetween and driving the same by frictional engagement with the surfaces of said belt members.

12. In apparatus for producing a filled plastic tube as claimed in claim 10, wherein said means for pulling the free end of the plastic tubing comprises four drive wheels having continuous grooved peripheries and continuous beveled edges, said wheels being disposed in a substantially cross-shaped arrangement with the beveled portions of the wheels engaging the similarly shaped portions of adjacent wheels and with the peripheral grooves of each wheel combining to form a single restricted opening for receiving said tubing therein and frictionally driving the same.

13. In apparatus for producing a filled plastic tube as claimed in claim 10, wherein said means for pulling the free end of the plastic tubing comprises a pair of drive wheels arranged in spaced relation to each other for rotation in the same plane, a continuous belt disposed on the peripheries of said wheels, said belt having a plurality of spaced openings arranged along the center line thereof, and a vacuum chamber disposed intermediate said wheels and in communication with said openings for providing a reduced pressure at the outer part of the openings in said belt between said wheels to thereby cause said tubing to be pressed against said belt and moved along in the direction of movement of said belt.

14. In apparatus for producing a filled plastic tube as claimed in claim 9, wherein said first and second clamping and sealing means comprise a first pair of diametrically opposed clamping members for bearing against opposite surfaces of said tube adjacent its end, a second pair of diametrically opposed clamping members disposed substantially perpendicular to said first pair for bearing against opposite surfaces of said tube adjacent said first pair, and conduit means for applying heated air to the end of said tube while engaged by said first and second pairs of clamping members.

15. In apparatus for producing a filled plastic tube as claimed in claim 9, wherein said pneumatic ejection means comprises a conduit for supplying compressed air to the upper end of said chamber, and a chute disposed below the lower end of said chamber for conveying the ejected tube from said chamber to said receptacle.

16. Apparatus for producing a filled plastic tube comprising, in combination, a spindle rotatable about a substantially horizontal axis and having a continuous supply of plastic tubing wound thereon, rotatable drive wheels relatively positioned so that the peripheries of said wheels provide a restricted passage for grippingly receiving said tubing and directing it downwardly along a definite path, means for rotating at least one of said wheels, a drum shaped support means mounted for rotation about a vertical axis, a plurality of vertically disposed elongated chambers carried by said support means, ratchet means for rotating said support means through a plurality of positions whereby each of said chambers is successively disposed in the path of movement of said plastic tubing for receiving said tubing therein, a swingably mounted severing means disposed adjacent the upper end of the chamber into which the tubing is being directed for severing said tubing when said tubing has advanced through said chamber, means actuated by the end of said tubing extending from the lower end of said chamber for operating said severing means, first clamping and sealing means comprising a first pair of diametrically opposed clamping members for bearing against opposite surfaces of said tube adjacent its lower end, a second pair of diametrically opposed clamping members disposed substantially perpendicular to said first pair for bearing against opposite surfaces of said tube adjacent said first pair, and conduit means for applying heated air to the end of said tube while engaged by said first and second pairs of clamping members for sealing the lower end of the severed tube, a hopper for containing a supply of granular material, a measuring chamber disposed below said hopper and in communication with said hopper, a nozzle portion disposed below said measuring chamber for conveying a measured quantity of granular material along a gravity path from said measuring chamber into a tube after said lower end thereof has been sealed, second clamping and heating means substantially identical to said first clamping and heating means for sealing the upper end of the filled tube, a conduit for supplying compressed air to the upper end of a chamber containing a completed tube for ejecting the tube, and a chute disposed below the lower end of the chamber for conveying the ejected tube from said chamber to a storage receptacle.

17. Apparatus for producing a filled plastic tube as defined in claim 9, wherein said means for dispensing a measured amount of granular material comprises a hopper containing a supply of said material, a measuring chamber disposed below said hopper in communication therewith and including a body member having a central vertical opening for receiving granular material from said hopper, one vertical wall of said central opening comprising an adjustable spacer block for varying the volume of said measuring chamber, first valve means disposed between said hopper and said measuring chamber for controlling the flow of granular material from said hopper to said measuring chamber, second valve means disposed between said measuring chamber and said nozzle portion for controlling the flow of granular material from said measuring chamber into said nozzle portion, said first and second valve means each comprising a slidably mounted flat plate disposed in said gravity path, said flat plates being joined by a yoke for simultaneous linear movement in parallel planes extending substantially transversely of said gravity path, each of said plates having openings formed therein and adapted for alignment with said gravity path at a different position during said linear movement.

References Cited by the Examiner

UNITED STATES PATENTS

| | | | |
|---|---|---|---|
| 1,780,142 | 10/30 | Becker et al. | 53—29 X |
| 2,156,466 | 5/39 | Vogt | 53—29 |
| 2,179,373 | 11/39 | Hitt | 53—183 X |
| 2,217,336 | 10/40 | Eden | 53—29 X |
| 2,295,335 | 9/42 | Cloud | 53—183 X |
| 2,503,171 | 4/50 | Posner | 53—29 X |
| 2,613,488 | 10/52 | Attride | 53—182 X |
| 2,881,574 | 4/59 | Wardell | 53—137 X |
| 2,926,474 | 3/60 | Morrison et al. | 53—373 |
| 2,928,218 | 3/60 | Lecluyse et al. | 53—373 X |
| 2,969,628 | 1/61 | Ismscher | 53—180 X |
| 2,982,074 | 5/61 | Shiu | 53—373 |

FRANK E. BAILEY, *Primary Examiner.*

ROBERT A. LEIGHEY, BROMLEY SEELEY, *Examiners.*